April 7, 1925.
J. W. RUGGABER
DRINK MIXER
Filed Oct. 7, 1921
1,532,268
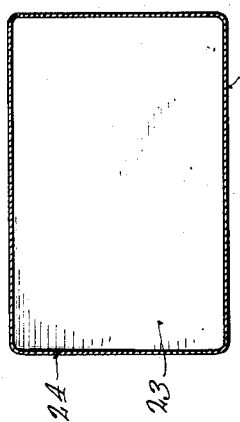
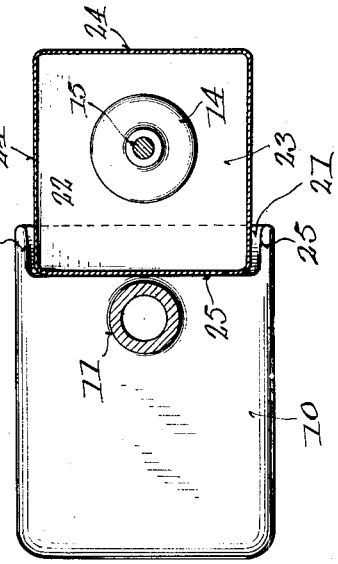
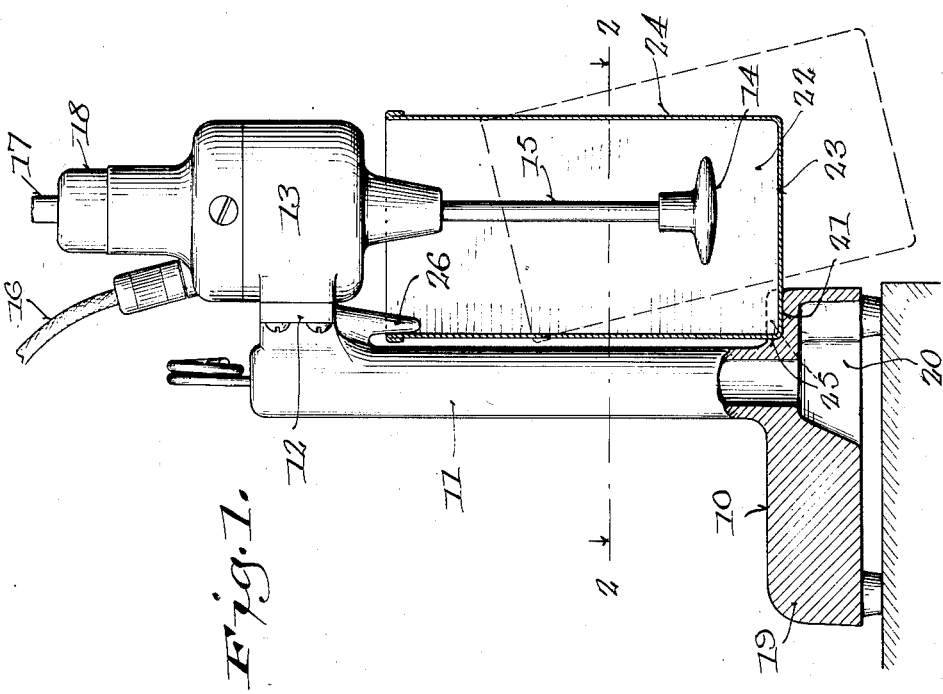
INVENTOR.
JOHN W. RUGGABER
BY
*Ralph W. Brown*
ATTORNEY.

Patented Apr. 7, 1925.

1,532,268

UNITED STATES PATENT OFFICE.

JOHN W. RUGGABER, OF RACINE, WISCONSIN, ASSIGNOR TO THE GILCHRIST COMPANY, OF NEWARK, NEW JERSEY, A CORPORATION OF NEW JERSEY.

DRINK MIXER.

Application filed October 7, 1921. Serial No. 505,986.

*To all whom it may concern:*

Be it known that I, JOHN W. RUGGABER, a citizen of the United States, residing at Racine, in the county of Racine and State of Wisconsin, have invented a certain new and useful Improvement in Drink Mixers, of which the following is a full, clear, concise, and exact description, reference being had to the accompanying drawings, forming a part of this specification.

This invention relates to drink mixing apparatus, and more particularly, to that type of apparatus in which the liquid and other ingredients are placed within a container and mixed together by means of a motor driven rotary agitator.

Various attempts have heretofore been made to increase the effectiveness of apparatus of this character, with a view to obtaining a thorough mixture within a shorter interval of time. These attempts have led to the adoption of agitators of various shapes.

A rounded container of substantially cylindrical or frustro-conical shape has heretofore been universally employed, however, and the agitator has ordinarily been arranged for rotation about a vertical axis substantially coincident with the longitudinal axis of the container. Under these conditions, the contents of the container tend to rotate with the agitator, with the result that the effectiveness of the agitator is materially reduced, and the vortex effect produced causes the contents to climb and escape over the walls of the container. Due to this latter effect, the size of the agitator is necessarily limited.

One object of the present invention is to increase the effectiveness of apparatus of this character by the use of a container of such shape that for all practical purposes this whirling or vortex action of the liquid is prevented. This is accomplished by the use of a container substantially angular in horizontal section. With a container of such shape, I have found that an agitator of a size considerably greater than those heretofore employed may be used without creating any marked vortex effect upon the contents of the container. The effectiveness of the agitator is thus materially increased, thus making it possible to employ a container having a capacity two or three times that of the ordinary type and to effect a thorough mixture of the entire contents thereof, in a much shorter interval of time than that ordinarily required to mix a single drink by the apparatus heretofore employed.

Another object is generally to improve and simplify the construction and operation of apparatus of this character.

Other objects and advantages will later appear.

An embodiment of the invention is illustrated in the accompanying drawings, in which:

Figure 1 is a side elevation, partly in section, of a drink mixer constructed in accordance with the present invention.

Figure 2 is a horizontal sectional view taken substantially on the line 2—2 of Figure 1.

Figure 3 is a horizontal sectional view of a container of somewhat different shape, having a greater capacity than that shown in the other views.

The apparatus selected for illustration includes a support, in the form of a casting having a base 10 and an upright standard 11 preferably hollow and preferably arranged upon the forward portion of the base 10. The standard 11 is provided at the upper end thereof with a bracket 12 to which is secured an electric motor 13 of any standard or appropriate construction. The motor is mounted in vertical position and preferably arranged to overhang the base 10. An agitator 14 is carried and driven by the motor. This agitator is of a form similar to that in common use, except that it is preferably considerably larger than those heretofore employed. For instance, the agitator shown is of a diameter substantially twice that of agitators in common use. This agitator is mounted in the usual manner upon the lower end of a vertical shaft 15 supported by and connected with the motor armature shaft. The motor is provided with the usual leads 16 and is controlled by a push button 17 forming a part of a switch mechanism 18 of any standard construction, preferably mounted in the upper end of the motor casing.

In order to counterbalance the weight of the motor, the rear portion 19 of the base 10 is preferably in the form of a relatively thick solid casting, while the forward portion thereof is preferably hollowed out as at 20 to reduce the weight thereof. Further stability is secured by projecting the base 10 somewhat forwardly of the standard 11. This forwardly projecting portion also serves as a ledge 21 to sustain the weight of the container 22 in a manner to be later described.

As above pointed out, the container is of an angular shape in order to destroy the whirling or vortex effect ordinarily produced by the rotation of the agitator 14. Various shapes may be employed but it has been found that a container of substantially rectangular shape gives excellent results.

The containers shown each have a flat rectangular base 23 and upright walls 24 joined together and to the base so as to form a substantially rectangular compartment to receive the liquid and other ingredients to be mixed. The container shown in Figures 1 and 2 is of sufficient capacity for mixing three or four drinks at a time, while that of Figure 3 is designed to hold sufficient quantities for mixing as many as six drinks at a time. Both containers are of substantially the same height and both have substantially the same transverse dimension so that either may be applied to use in the same machine.

Various means may be provided for releasably securing a container in operative position in the machine. In the apparatus shown, however, a novel arrangement of parts is provided for this purpose, by which the container may be placed in or removed from working position by a very simple manipulation thereof. In this instance, the base 10 is suitably fashioned to provide upstanding shoulders 25 which cooperate with the ledge 21 to form a seat for the rear, lower corner of the container, by which the container is supported and retained against transverse movement. To retain the container in upright position, a depending lug 26 is provided below the bracket 12 in position to bear against the inner side of the rear wall of the container, as shown in Figure 1.

Thus it will be seen that to position the container it is only necessary to raise the container upwardly from a position beneath the agitator 14 until the upper edge thereof engages beneath the lug 26, and then shift the bottom of the container rearwardly until the lower rear corner thereof is properly seated upon the ledge 21 and against the upstanding shoulders 25. It will thus remain in fixed position until manually removed by a reverse manipulation.

Various changes may be made in the embodiment of the invention hereinabove specifically described, without departing from or sacrificing any of the advantages of the invention as defined in the following claims.

I claim:

1. In a drink mixer, the combination with a container, of a base having a ledge adapted to receive a portion of the container and to support it at its bottom, a standard rigid with said base, a hook on the upper portion of the standard adapted to extend into and engage the inner periphery of the upper margin of the container to hold it in upright position, a motor supported by said standard and a stationarily supported rotary agitator driven by said motor and suspended from above with sufficient clearance to permit the container to be manually manipulated into its operative position on the ledge.

2. In a drink mixer, the combination with a container, of a base provided with integral means forming a recess adapted to receive a portion of the container and to support it at its bottom, a standard rigid with said base, a hook on the upper portion of the standard adapted to extend into and engage the inner periphery of the upper margin of the container to hold it in upright position, a motor supported by said standard and a stationarily supported rotary agitator driven by said motor and suspended from above with sufficient clearance to permit the container to be manually manipulated into its operative position in the recess.

3. In a drink mixer, the combination with a container, of a base having a ledge adapted to receive a portion of the container and to support it at its bottom, a standard rigid with said base, a hook integral with the upper portion of the standard adapted to extend into and engage the inner periphery of the upper margin of the container to hold it in upright position, a motor supported by said standard and a stationarily supported rotary agitator driven by said motor and suspended from above with sufficient clearance to permit the container to be manually manipulated into its operative position on the ledge.

In witness whereof, I hereunto subscribe my name this 19th day of September, 1921.

JOHN W. RUGGABER.